(12) United States Patent
Haarmann et al.

(10) Patent No.: US 8,375,730 B2
(45) Date of Patent: Feb. 19, 2013

(54) SELECTING PACKAGING AND COOLANT SYSTEMS FOR SHIPMENT OF BIOLOGICAL PRODUCTS

(75) Inventors: Klaus H. Haarmann, Frisco, TX (US); Anthony Alleva, Keansburg, NJ (US); Eric Paul Mirabel, Houston, TX (US)

(73) Assignee: TCP Reliable, Inc., Edison, NJ (US)

( * ) Notice: Subject to any disclaimer, the term of this patent is extended or adjusted under 35 U.S.C. 154(b) by 0 days.

(21) Appl. No.: 13/358,662

(22) Filed: Jan. 26, 2012

(65) Prior Publication Data

US 2012/0197810 A1   Aug. 2, 2012

Related U.S. Application Data

(63) Continuation-in-part of application No. 13/274,593, filed on Oct. 17, 2011, now Pat. No. 8,192,924.

(60) Provisional application No. 61/437,555, filed on Jan. 28, 2011.

(51) Int. Cl.
*B65B 63/08* (2006.01)
*F25D 19/00* (2006.01)
*F25D 3/08* (2006.01)

(52) U.S. Cl. .............. 62/60; 62/457.2; 62/371; 705/332

(58) Field of Classification Search ............ 62/371, 62/60; 705/332
See application file for complete search history.

(56) References Cited

U.S. PATENT DOCUMENTS

| | | | |
|---|---|---|---|
| 4,162,676 A * | 7/1979 | Talcott | 604/408 |
| 7,130,771 B2 * | 10/2006 | Aghassipour | 702/187 |
| 7,294,374 B2 | 11/2007 | Romero | |
| 7,581,406 B2 | 9/2009 | Sekiyama | |
| 7,655,421 B2 * | 2/2010 | Lynes et al. | 435/7.2 |
| 7,908,875 B2 | 3/2011 | Smith | |
| 7,919,163 B2 | 4/2011 | Romero | |
| 7,963,397 B2 * | 6/2011 | Seagle et al. | 206/600 |
| 2002/0104808 A1 * | 8/2002 | Blasetti et al. | 210/782 |
| 2006/0099567 A1 | 5/2006 | Muller-Cohn | |
| 2006/0210429 A1 * | 9/2006 | Hunsley et al. | 422/61 |
| 2008/0307117 A1 | 12/2008 | Muller-Cohn | |
| 2009/0298132 A1 | 12/2009 | Muller-Cohn | |
| 2010/0064698 A1 | 3/2010 | Schabron | |
| 2010/0289669 A1 | 11/2010 | Saltzman | |
| 2010/0299278 A1 | 11/2010 | Kriss | |
| 2010/0326993 A1 | 12/2010 | Mayer | |

FOREIGN PATENT DOCUMENTS

EP    2221569 A1    8/2010

OTHER PUBLICATIONS

Sebra Instruction Manual, Thermasure Temperature Stabilizer Model 1290, Sep. 2004, Rev. N, All pages.*
UPS Expands Healthcare Capabilities to Asia with Two Cold Chain Offerings Press Release Nov. 25, 2011 http://www.ups.com/content/cn/en/about/news/press_releases/20111128_cn_pharmaport.html (UPS Website).

* cited by examiner

*Primary Examiner* — Frantz Jules
*Assistant Examiner* — Cassey D Bauer
(74) *Attorney, Agent, or Firm* — Eric P. Mirabel

(57) ABSTRACT

Disclosed is a process of selecting of a container and temperature-control system, such that biological products (including blood) requiring maintenance within a specified range of temperatures are so maintained during shipment. The process requires a prediction of the maximum period of shipment, and the predicted ambient temperature ranges and time of exposure thereto for the system during the period of shipment. With that information, a system of container(s) with temperature-control agents including dry ice, ice, frozen gel packs or a phase change material, is selected.

17 Claims, 3 Drawing Sheets

1. Review temperature range requirements for product to be shipped

2. Determine ambient temperature range, from $T_H°$ to $T_L°$, over shipment period $S_t$ 3. Select systems which can maintain product during $S_t$ 4. Select one system [based on cost, ease of use, regulatory requirements, end-user requirements]

5. Build the system selected and use it for product shipment

US 8,375,730 B2

SELECTING PACKAGING AND COOLANT SYSTEMS FOR SHIPMENT OF BIOLOGICAL PRODUCTS

RELATED APPLICATIONS

This application is a continuation-in-part of and claims priority to U.S. application Ser. No. 13/274,593, filed Oct. 17, 2011 (U.S. Pat. No. 8,192,924), which is a non-provisional of and in turn claims priority to U.S. Provisional No. 61/437,555, filed Jan. 28, 2011.

FIELD OF THE INVENTION

The invention relates to packaging and coolant systems for shipment of temperature-sensitive biological products.

BACKGROUND OF THE INVENTION

In the pharmaceutical, transplant and food industries, insulated containers in combination with temperature-control agents, such as refrigerant materials, are widely used as a cost-effective system to maintain the temperature of shipped products at selected temperature ranges, including refrigeration (2-8° C.); room temperature (20-30° C.); or frozen (below 0° C.). The temperature-control agents are generally phase change materials, ice, gel packs, or dry ice.

Phase change materials are defined herein as materials which may be repeatedly converted between solid and liquid phases and utilize their latent heats of fusion to absorb, store and release energy to heat or cool during such phase conversions. In contrast to a material that absorbs and releases energy essentially uniformly over a broad temperature range, a phase change material absorbs and releases a large quantity in the vicinity of its melting/freezing point, thus facilitating temperature maintenance near the melting/freezing point.

Passive refrigerant systems utilizing insulated containers and phase change materials (and/or ice, gel packs, or dry ice) provide sufficient refrigeration for relatively short shipping periods, where, as an additional condition, the ambient temperature does not vary greatly from the internal temperature for extended periods. As shipment times are often longer than the period where ice in an insulated container will melt completely, refrigerant systems using combinations of phase change materials, gel packs and insulated containers are commonplace for shipment of temperature-sensitive products. See, e.g., U.S. Pat. Nos. 7,849,708 and 7,294,374 (both incorporated by reference). Other systems of insulated containers, and phase change materials can be used to extend the time that products within are maintained at room temperatures or at temperatures below freezing (and the latter systems may also include ice or gel packs or dry ice, as appropriate), so as to match the shipment period and the shipment conditions (most importantly, the ambient temperature).

When a number of combinations of insulated containers, phase change materials and gel packs or other materials are possible, a combination selected must be matched to expected shipment time and predicted ambient temperature, preferably with a view to selecting the lowest-cost combination for a system which can maintain the temperature required for the product.

SUMMARY

The selecting of a container and temperature-control system is performed such that products requiring maintenance within a specified range of temperatures are so maintained during shipment. The products for shipment include biological products, for example, cells, tissues, organs, blood and blood products, microbes, microbial spores, yeast, and plants and plant materials, which are evaluated, assayed or tested following shipment to determine their viability, survival or suitability for in vivo use. The process requires a prediction of the maximum period of shipment, and the predicted ambient temperature ranges and time of exposure thereto for the system during the maximum period of shipment. Alternatively, instead of predicting ambient temperature ranges for the system and time of exposure thereto, a postulated worst case scenario for ambient temperatures (winter and summer) and shipment time can be used.

The "ambient temperature," i.e., the ambient temperature for the system, is not the environmental ambient temperature, but rather, is the ambient temperature experienced by the system; e.g., the temperature inside the cargo area of the shipment mode (i.e., inside a truck-trailer, or an airplane cargo hold) or in a warehouse while in transit. The environmental ambient temperature will affect the ambient temperature for the system during shipment, unless the cargo area is actively temperature-controlled. The environmental ambient temperature will change as the system moves to its destination through environmental temperature fluctuations, thereby causing the ambient temperature to also fluctuate (unless the system is in a temperature-controlled area).

Either experimentation, or derivation from the properties of the system components, can be used to establish a database for a variety of packaging and temperature-control systems. The database provides the length of time each member system in the database maintains products within a specified range of temperatures, when the member system is exposed to specified ranges of ambient temperatures for specified time periods. The database may also provide historic information on environmental ambient temperatures along different shipment routes, in different seasons. The database can be used in deriving the predicted temperatures ranges the system will be exposed to during shipment to a specified location over a predicted shipment period with a particular system, or these predicted ranges and exposure times can be entered by the operator. The system can be monitored during shipment to ascertain ambient temperature and time of exposure thereto, as well as the temperature inside the system during actual shipment, to verify the predictions, supplement the database, and provide protection for the products in case of temperature excursions.

As noted above, an alternative to predicting ambient temperatures and the shipment period is to establish worst case scenarios—i.e., the predicted boundaries of the temperature range(s) in summer and winter, and the maximum predicted period of shipment/exposure based on destination and mode of shipment selected. Then, a system is selected which maintains the products within the required temperature range under these conditions; and it will necessarily also do so under generally-encountered shipping conditions.

The range of temperatures the products are to be maintained within during shipment (inside the shipping system) is used to select an appropriate shipping system, using the database and applying a selection algorithm to it. The system selected can include some combination of insulated container(s), phase change materials, and other temperature control agents such as ice, gel packs or dry ice. The selection can be done by an algorithm which, based on heat transfer characteristics of the system and melting characteristics of the temperature-control agents, derives a system able to maintain the product temperature within the required range under the predicted conditions.

The database can be retained on a computer and the selection can be made by inputting the requirements into the computer and using an algorithm to select a system from the database. Alternatively, several systems can be displayed by the computer, with prices displayed for each, allowing the lowest cost system to be selected. Another alternative is to use an algorithm to determine the lowest-cost combination of shipper's charges to a destination (which increases with shorter delivery times) and a system which can maintain product temperature for the shipment period. This algorithm can also be performed on the computer that includes shippers' charges in a database.

Monitoring of the ambient or inner system temperature during shipment allows verification and modification of the predicted temperature values based on experience, and permits providing an alert in the event there are excursions outside the required temperature ranges for the product. In the event of an alert, the shipper can be instructed to add phase change material, move the container to a temperature-controlled ambient environment (e.g., a refrigerated cargo hold), or add ice or gel packs to the container.

Preferably, a range of shipping systems are provided from the database, with costs displayed for each. While the lowest priced alternative would usually be preferred, the consignor (or customer) may choose one with a higher price and wider safety margin in the event of temperature excursions, to ensure the products stay within the required temperature range, especially if wide excursions are anticipated (the standard deviation of the temperatures en route are wide).

With respect to shipment of blood from donors, for direct donation and/or for processing into blood products, Currently, Fresenius HemoCare (Redmond, Wash., USA) offers two cooling and transport systems for blood bags: Compocool, and a more recent version, Compocool II™/Compocool WB™, in which the butane-1,4-diol cooling unit is placed in an insulated crate. Additionally, Sebra/Haemonetics (Tucson, Ariz., USA) offers butane-1,4-diol-filled transparent pouches (ThermaSure), developed for the transport of platelet concentrates and blood units at 22±2° C. One of more of these cooling and transport systems, or other suitable blood cooling and transport systems, can be the cooling system selected in the method described herein for shipping of blood bags. In such case, the cooling and transport system (with the blood bags) would be placed into an insulated container, which may have additional temperature control agents. Blood is to stay within a confined temperature range to maximize benefit for recipients of blood or blood products, so the selection method described herein is particularly well-suited to selection of systems for blood and blood product shipment.

DETAILED DESCRIPTION

Figure 1:
FIG. 1 is a flow diagram showing the steps in selecting an appropriate packaging and temperature-control system under the simplest case scenario, when the assumed temperature range is from the summer to winter extremes over the shipment period.

Over the course of shipment, the ambient temperature (i.e., the temperature the shipping container experiences) varies over time. The simplest case to ensure that the packaging system selected for shipment will comply with the temperature range restrictions for the products it carries, is to assume the ambient temperature range is from the highest ambient summer temperature to the lowest ambient winter temperature for the entire shipment period. The selection process of an appropriate shipment system under the simplest case scenario is shown in FIG. 1.

Figure 2:
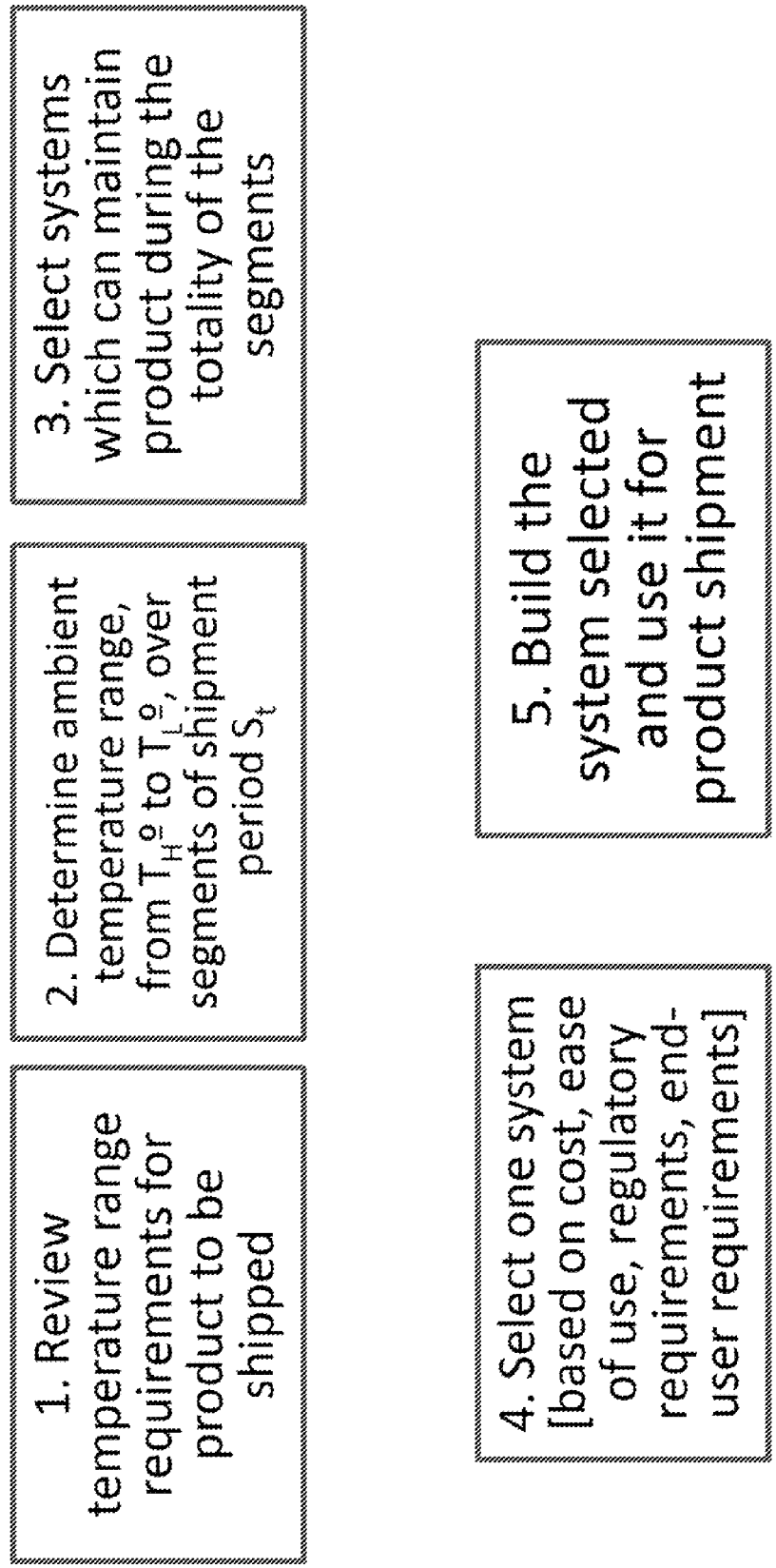
FIG. 2 is a flow diagram showing the steps in selecting an appropriate packaging and temperature-control system under the scenario where the assumed temperature ranges are segmented by time and vary over the shipment period.

The simplest case scenario (where one assumes the temperature range during shipment is from the highest likely to the lowest likely temperature, $T_H°$ and $T_L°$, respectively, over the entire shipment period $S_t$), can be segmented to represent exposure times to different ambient temperature ranges likely to be encountered en route. The total of these ranges and exposure times represent the ranges encountered over $S_t$. Segmenting in this manner allows designation of more systems which can meet the product requirements, i.e., it reduces the stringency of the system selection. Segmenting in this manner is shown in FIG. 2.

As an example of segmenting: the system may begin its journey in a truck trailer without temperature control, then move to a temperature-controlled warehouse, then back to an uncontrolled truck trailer to finish its journey to the destination. If the time in the truck trailer is $s^{TT}$ and the time in the warehouse is $s^W$, then $S_t = s^{TT} + s^W$, and the summer to winter range of $T_H°$ and $T_L°$ would only be applied during $s^{TT}$ in selecting packaging systems which could meet the product requirements. During $s^W$ the temperature is controlled (designated $T^X$), and therefore, likely to be closer to the required temperature for the product, thereby conserving the temperature-control agents (which may be coolants) in the packaging system during $s^W$. Therefore, the temperature $T^X$ is applied to the $s^W$ segment of the trip in selecting an appropriate system.

As experience (actual data) is collected to determine the actual range of the ambient temperatures encountered, and the time of exposure to different temperature ranges on different shipment routes during different seasons, the temperature model can be modified, so that instead of applying the summer to winter $T_H°$ to $T_H°$ across portions of $S_t$, values for $T_H°$ to $T_L°$ representing temperature ranges closer to those actually likely to be experienced are substituted, along with the expected times of exposure to these temperature ranges. That is, during $s^{TT}$, if the temperature range applied in the model is based on experience rather than worst case, it will necessarily also be closer to the required temperature for the product than the worst case range, thereby again conserving the temperature-control agents (which may be coolants) in the packaging during $s^{TT}$, and allowing selection from a broader range of systems which can meet the product requirements.

Systems which meet the requirements for a particular product shipment can be selected from a database, where systems in the database have been tested to determine their ability to maintain the required inner temperature over the predicted ambient temperatures and the time period of their exposure to such temperatures. One testing method is to expose a series of systems to high temperatures and determine the melting time(s) for temperature-control agents inside. Another method of selecting systems is by derivation of expected temperature-control agent melting time(s) from the properties of the system's containers and temperature-control agents, at the predicted ambient temperature and time of exposure thereto.

Figure 3:
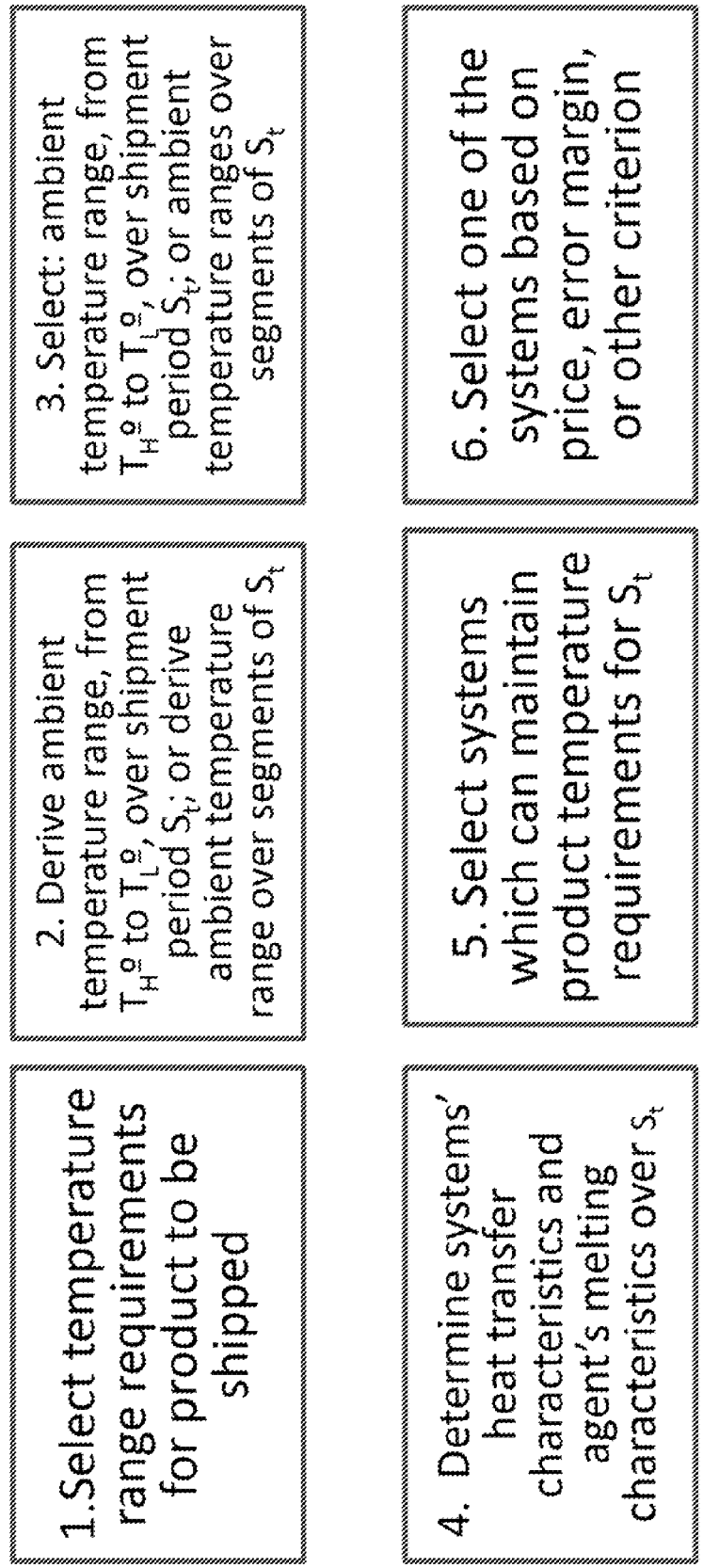
FIG. 3 is a flow diagram of the selection algorithm for, choosing an appropriate system under different criterion.

A computer program to select appropriate systems for shipment runs an algorithm which, based on the product temperature requirements, either selects one of the systems actually tested which meets the requirements, or, based on the heat transfer characteristics of different systems (i.e., the heat transfer characteristics of both the temperature control agents and the container(s) in a system), and also the melting characteristics of the temperature-control agents, it derives melt times and inner temperatures of different systems, and displays those which can maintain the required product temperature for the shipment period (specified by the operator). This latter type of algorithm is shown in the flow diagrams in FIG. 3.

The ambient temperature applied by the program can be the simplest case projection (a range from expected summer highs to winter low temperatures over the shipment route for the shipment period) or the segmented ranges and their respective times experienced. The ambient temperatures in the computer database can be updated and supplemented based on those actually experienced by systems, or, updated based on derived ambient temperatures resulting from the environmental ambient temperatures logged or predicted. The computer program can also indicate the standard deviations in temperatures and shipment times, and select systems that will function to maintain the product temperature. This can allow a customer to select a system that offers a wider margin of error, in consideration of cost for the additional margin, value of the product shipped, and criticality of product temperature maintenance.

A database of environmental temperatures along shipment routes (from which ambient temperature can be derived) can be established by compiling the historical temperature records for the route, or by actual monitoring, or by a combination of historical data and actual monitoring. In providing for the widest safety margin, one would determine the highest summer temperature ever and the lowest winter temperature, and then derive ambient expected temperature from those extremes.

On the other hand, if a shipper can warranty certain ranges of ambient temperatures (i.e., climate controlled shipment and warehousing, from start to finish), there is no need to review or determine the environmental ambient temperature. The key to controlling the temperature of the product shipped, in such case, is to ensure there are no delays in shipment— which the shipper may also warranty. The temperature-control agent will eventually melt under a temperature differential from internal to ambient—so accurately determining the shipment period is always critical.

As noted, the temperature data from shipments can be added to the database, which is preferably done automatically where the database is stored on a computer. As the database expands, the predictions of the temperature ranges during various segments of shipment along routes where more data has been accumulated should become more reliable and deviations should narrow.

The temperature (and optionally related conditions that may affect temperature-control agent melting like relative humidity) should be collected at multiple points during shipment. These datapoints can be used to construct a cold chain map. The map is preferably plotted at different times of the year to form a series of season-specific cold chain maps. These season-specific cold-chain maps can be used to derive a more accurate prediction of the temperatures the system would be likely to experience during any particular shipment.

The data on temperature during shipment can be collected using datalogging devices which are analyzed after shipment, or devices which transmit temperature data to a monitoring station (using RF transmission) throughout shipment. Both types of devices are available from Alternatives Technologie Parma Inc., Laval, Quebec. Actual monitoring may be needed for customer assurance, or to meet the FDA GMP requirements, if the products are subject to FDA jurisdiction, for example, pharmaceuticals, biological products or blood products. The monitoring system may be designed to track and log the temperature automatically during shipment, if this is a requirement under applicable regulations. The temperature log can also be automatically documented, if this is a regulatory requirement or part of the standard operating procedures (SOPs) for regulated products.

The database also includes heat transfer characteristics of the system constituents, including the containers. The materials forming the containers are typically conventional materials used in fabricating portable coolers, e.g., expanded polystyrene or polyethylene, because of their insulating properties. The database also includes melting characteristics of a variety of phase-change materials and coolants which can be included in the packaging, as well as melting characteristics of a number of combinations of packaging and phase change materials and/or coolants. The computer can be programmed to display systems meeting several different requirements, as selected by the operator:

1. Find systems which meet the worst case temperature range for $S_t$ (FIG. 1).
2. Find systems which meet the time-segmented temperature ranges for $S_t$ (FIG. 2).
3. Find systems which can meet the worst case or time-segmented temperature ranges for $S_t$, where the temperature ranges are entered by the requestor and are based on historic data and weather forecasts for the shipping route.
4. Find systems which can meet the worst case or time-segmented temperature ranges for $S_t$, where the temperature ranges are entered by the requestor and are based on historic data and weather forecasts for the shipping route and/or on data collected during shipment on the route.
5. Find systems meeting the criterion in 1 to 4 above, which are least expensive.
6. Find systems meeting the criterion in 1 to 4 above, which, in combination with shipper's charges, are least expensive.

Whichever of the selection criterion (1-6 above) are applied, more than one system may meet the criterion and be selected by the selection algorithm as appropriate. For example, if one uses an insulated container with better insulating properties (like, thicker walls), one may potentially need less ice, gel packs, or phase change material. In these cases, a secondary selection criterion can be applied, including but not limited to the lowest-cost system (as in 5 and 6); or, the system with an appropriate error/safety margin in view of: ambient temperatures outside predicted ranges or delays in initiating shipping or delays en route. These secondary criterion can be specified by the customer or the party providing the systems to the customer.

Using the monitoring systems available from Alternatives Technologie Parma Inc., Laval, Quebec; allows transmitting data regarding temperature, and also pressure, relative humidity, and $CO_2$ levels, using RF, other wireless modes or WiFi. A GPS system allows locating the system for all data received. Alarms which can be monitored indicate excursions. The data transmitted by the sensors is recorded and preserved on a database, which is web-accessible. As noted, this monitoring system could be used to verify or refute predicted temperatures, or to establish or supplement a cold chain map along different shipment routes. The alarm features make it attractive where maintaining product temperature is critical; i.e., for blood or other biological products.

Where the selection is performed on a computer, system selection can be performed from a remote location, thereby allowing the customer to do it directly. This can be accomplished, for example, through a web-based computer access system. The customer can then directly receive the system selections and make a choice on the basis it chooses, including pricing or systems with the widest safety margin, to ensure that the products are maintained, notwithstanding some ambient temperature excursions. Customers may also want to select on other basis, such as minimizing environmental or toxic footprint.

To make a selection of an appropriate system, one may also need to monitor and establish the effect the ambient temperature has on the ice, gel packs or phase change material in each type of container which can be part of a system, over time. Alternatively, such effect can be derived from the heat transfer characteristics of the packaging and the melting time of the ice, gel packs or phase change material, and not verified by actual monitoring. A monitoring system which travels with the packaging, as described above, and which includes an alarm system for temperature excursions, is useful whether or not data was compiled as to actual melting times for a system. The alarm system can alert the shipper or recipient that the phase change material or ice may be melted and needs to be checked, and supplemented if appropriate.

Segmenting the time of exposure to environmental ambient temperatures is a method to allow use of passive coolant systems, in cases where without segmenting, the temperature control agents would be predicated to melt completely, and would therefore be unsuitable for use. Selection of an appropriate temperature-control system including a temperature segmenting step is shown in FIG. 2. Segmenting is particularly appropriate in cases where the ambient temperatures are unregulated during shipment, like in a truck trailer, but spends a substantial part of the trip in a temperature-controlled environment (warehouse or temperature-controlled cargo hold). The effect of exposure to the unregulated ambient temperatures is determined over the time of exposure, so as to avoid over-compensating for the temperature extreme(s) during this exposure, and changing system requirements where there is no need to.

The containers for the system can be any of a number of designs and materials, including expanded polystyrene and polyethylene. Containers can also be multi-layered, one inside another, with one such arrangement shown in U.S. Pat. No. 7,849,708 (incorporated by reference), wherein an inner container includes a phase change material and the product, and an outer container includes gel packs. Various combinations of containers, gel packs, ice, dry ice and phase change materials are readily apparent to one skilled in the art. For example, one could have multiple containers layered within each other, with layers of different temperature-control agents in different quantities in different containers.

Phase change materials are relatively expensive, and thus one seeks to minimize their use, and substitute ice, gel packs, dry ice or container designs which add insulation, where feasible. Phase change materials are not consumed in the cooling process, and can be re-frozen and used again. But a practical difficulty in re-use may be that the customer will not return the phase change material they receive—meaning it must be expensed with the rest of the system, which the customer would usually retain.

Selection of an appropriate temperature control system can also permit selection of slower, lower-cost shipment options. The cost of the faster shipment options can be balanced against the cost of a system which can maintain the product for the time required under slower shipment modes, and the total shipment cost may be lower when using slower shipment with a more expensive system (which includes more phase change material, gel packs, or better insulation containers). Customers may be able to save considerable shipping expenses with the system selection herein.

Because of seasonal changes in the environmental temperatures, customers may select different systems for different seasons. Again this allows selection of lower-cost systems where the environmental ambient temperature is closer to the temperature the product must be maintained at. Such seasonal temperature fluctuations are preferably in the database and are used in the algorithm used in selection of shipment systems.

At some point following arrival of biological materials at the end-user destination following shipment, the materials would be tested to determine their suitability for use in patients or as reagents in assays or otherwise tested to determine their suitability for the purpose they were requested by the end-user. The effect of shipment on the products might be determined soon after arrival, or, their suitability for use in patients or as reagents may be tested well after arrival. In either case, a biological assay is performed on the products, which can be one or more of: an antibody-mediated assay including an enzyme-linked immunosorbent assay (See e.g., U.S. Pat. No. 8,021,850, incorporated by reference), a nucleic acid hybridization assay (See e.g., U.S. Pat. No. 8,036,835, incorporated by reference), an elongation-mediated chain terminating assay (U.S. Pat. No. 6,972,174 incorporated by reference), an elongation-mediated assay or a ligation assay (U.S. Pat. No. 7,262,032, incorporated by reference), a cell-based assay (U.S. Pat. No. 7,655,421, incorporated by reference) or a viability, blood-typing or tissue-type matching assay, including but not limited to an HLA-typing or a serological assay.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, any of the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims. It is also noted that as used herein and in the appended claims, the singular forms "a," "an," and "the" include plural reference, and the plural include singular forms, unless the context clearly dictates otherwise. Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants. The invention has been described broadly and generically herein. Each of the narrower species and subgeneric groupings falling within the generic disclosure also form part of the invention. The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A process of ensuring blood for transfusion requiring temperature-control is maintained within a range of 22° C.±2° C. during shipment, comprising:
    determining the maximum predicted period of shipment for the blood and the predicted ambient temperature ranges during shipment;
    establishing a database for a plurality of temperature-control systems, each system including containers and a phase change material within the containers wherein the database can be used to determine the length of time each member system can maintain blood housed in the containers with the phase change material within said range when the temperature-control system is exposed to specified ranges of ambient temperatures for specified time periods, and wherein the specified ranges and time periods can represent, respectively, the predicted ambient temperature ranges and times of exposure thereto for the member system during said maximum total predicted period of shipment;
    selecting a system of containers and a phase change material so that the blood is expected to be maintained within said range during the maximum predicted period of shipment at the predicted ambient temperature ranges;
    monitoring the system temperature to determine directly if it stays within a specified range or monitoring the ambient temperature and determining, by derivation, if the system temperature stays within the specified range such that the blood is maintained within said range;
    alerting an operator if the system temperature is outside the specified range, whereby pursuant to the alert, the operator takes or directs actions to bring the system temperature within the specified range; and
    testing the blood using a blood-typing assay wherein, in the course of the assay, there is one or more of: nucleic acid hybridization, nucleic acid chain elongation, antibody-protein binding, or protein-protein binding wherein the relative humidity, pressure, and $CO_2$ is also monitored during shipment.

2. The process of claim 1 wherein the database is established on a computer and the selection of a member system is performed as an algorithm executed by the computer.

3. The process of claim 1 wherein the systems further include dry ice, ice, or frozen gel packs.

4. The process of claim 1 wherein the database is established by deriving, from the characteristics of the containers and the phase change material, the length of time each member system can maintain products housed in the containers with the phase change material within a specified range of temperatures when the member system is exposed to specified ranges of ambient temperatures for specified time periods.

5. The process of claim 1 wherein the system selected is one which minimizes the use of the phase change material.

6. The process of claim 1 wherein the selection can be performed from a remote location through a web-based system allowing computer access.

7. The process of claim 1 wherein the system(s) selected and their price(s) are displayed in operator-readable form.

8. The process of claim 7 wherein the database also includes the shippers charges for different shipment options to a particular destination, and the alogrithm also determines the lowest-cost combination of system and shippers' charges to said destination.

9. The process of claim 1 wherein the predicted ambient temperature range is from the lowest ambient temperature likely to be experienced to the highest, and the predicted time period a member system is to be exposed to said predicted ambient temperature range is the entire length of the shipment period.

10. The process of claim 1 wherein the blood is in blood bags.

11. The process of claim 1 wherein the predicted ambient temperature range for the system during shipment is based on historic ambient temperature data for the predicted shipping route.

12. The process of claim 11 wherein ambient temperature data is monitored during shipment and alerts indicate excursions from the predicted ambient temperature range.

13. The process of claim 1 wherein the container is made of expanded polystyrene or polyethylene.

14. The process of claim 1 further including obtaining a warranty for delivery within the shipment period from a shipper.

15. The process of claim 1 wherein the system is in a temperature-controlled environment during shipment.

16. The process of claim 1 further including recording the temperatures monitored.

17. The process of claim 1 wherein the temperatures monitored are used in determining the predicted ambient temperature for blood shipped in the future.

* * * * *